United States Patent
Ahn et al.

(10) Patent No.: US 12,524,983 B2
(45) Date of Patent: Jan. 13, 2026

(54) IMAGE PROCESSING APPARATUS AND OPERATION METHOD THEREOF

(71) Applicant: SAMSUNG ELECTRONICS CO., LTD., Suwon-si (KR)

(72) Inventors: Iljun Ahn, Suwon-si (KR); Jaeyeon Park, Suwon-si (KR); Hanul Shin, Suwon-si (KR); Soomin Kang, Suwon-si (KR); Youngchan Song, Suwon-si (KR); Tammy Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 459 days.

(21) Appl. No.: 18/141,142

(22) Filed: Apr. 28, 2023

(65) Prior Publication Data

US 2023/0360359 A1    Nov. 9, 2023

Related U.S. Application Data

(63) Continuation of application No. PCT/KR2023/004673, filed on Apr. 6, 2023.

(30) Foreign Application Priority Data

May 9, 2022   (KR) .......................... 10-2022-0056890
Oct. 5, 2022  (KR) .......................... 10-2022-0127170

(51) Int. Cl.
*G06V 10/44*   (2022.01)
*G06T 3/40*    (2006.01)
(Continued)

(52) U.S. Cl.
CPC ................ *G06V 10/44* (2022.01); *G06T 3/40* (2013.01); *G06T 7/0002* (2013.01);
(Continued)

(58) Field of Classification Search
CPC .... G06V 10/44; G06V 10/761; G06V 10/764; G06V 10/82; G06T 3/40; G06T 7/0002;
(Continued)

(56) References Cited

U.S. PATENT DOCUMENTS 7,280,600 B2    10/2007   Orhand et al.
9,014,260 B2    4/2015    Alshin et al.
(Continued)

FOREIGN PATENT DOCUMENTS

JP       7195220 B2     12/2022
KR       10-1675116 B1  11/2016
(Continued)

OTHER PUBLICATIONS

International Search Report and Written Opinion issued Jul. 13, 2023 by the International Searching Authority in counterpart International Patent Application No. PCT/KR2023/004673. (PCT/ISA/220, PCT/ISA/210 and PCT/ISA/237).
(Continued)

*Primary Examiner* — Aaron W Carter
(74) *Attorney, Agent, or Firm* — Sughrue Mion, PLLC

(57) ABSTRACT

An image processing apparatus for performing an image by using one or more neural networks may include a memory storing one or more instructions and at least one processor configured to execute the one or more instructions to obtain classification information of a first image and first feature information of the first image, generate a first feature image for the first image by performing first image processing on the classification information and the first feature information, obtain second feature information by performing second image processing on the classification information and the first feature information, obtain fourth feature information by performing third image processing on third feature information extracted during the first image processing,
(Continued)

generate a second feature image for the first image, based on the second feature information and the fourth feature information, and generate a second image based on the first feature image and the second feature image.

20 Claims, 10 Drawing Sheets

(51) Int. Cl.
    *G06T 7/00*         (2017.01)
    *G06V 10/74*       (2022.01)
    *G06V 10/764*     (2022.01)

(52) U.S. Cl.
    CPC .......... *G06V 10/761* (2022.01); *G06V 10/764* (2022.01); *G06T 2207/20084* (2013.01); *G06T 2207/30168* (2013.01)

(58) Field of Classification Search
    CPC . G06T 2207/20084; G06T 2207/30168; G06T 2207/20081; G06T 5/70
    See application file for complete search history.

(56) References Cited

U.S. PATENT DOCUMENTS

| | | | |
|---|---|---|---|
| 9,288,495 B2 | 3/2016 | Kim et al. | |
| 10,607,120 B2 | 3/2020 | Bai et al. | |
| 10,832,450 B2 | 11/2020 | Tong et al. | |
| 10,853,986 B2 | 12/2020 | Elgammal | |
| 11,594,056 B2 | 2/2023 | Wakui | |
| 11,694,306 B2 | 7/2023 | Baek et al. | |
| 11,836,890 B2 * | 12/2023 | Lee | G06V 10/82 |
| 12,315,111 B2 * | 5/2025 | Wang | G06T 3/4046 |
| 2020/0364486 A1 | 11/2020 | Park et al. | |
| 2021/0334578 A1 | 10/2021 | Lim et al. | |
| 2023/0031143 A1 * | 2/2023 | Baek | G06T 3/4007 |
| 2023/0360169 A1 * | 11/2023 | Park | G06T 3/40 |
| 2023/0360359 A1 * | 11/2023 | Ahn | G06T 3/40 |
| 2023/0360382 A1 * | 11/2023 | Kang | G06N 3/0464 |
| 2025/0166345 A1 * | 5/2025 | Beye | G06V 10/454 |

FOREIGN PATENT DOCUMENTS

| | | |
|---|---|---|
| KR | 10-2017-0087734 A | 7/2017 |
| KR | 10-1807170 B1 | 12/2017 |
| KR | 10-1887558 B1 | 8/2018 |
| KR | 10-2020-0015095 A | 2/2020 |
| KR | 10-2020-0132304 A | 11/2020 |
| KR | 10-2221225 B1 | 3/2021 |
| KR | 10-2021-0154684 A | 12/2021 |
| WO | 2021/188254 A1 | 9/2021 |
| WO | 2022/057837 A1 | 3/2022 |

OTHER PUBLICATIONS

Karras, Tero et al., "A Style-Based Generator Architecture for Generative Adversarial Networks", CVPR, 2019. (10 pages total).
Wang, Xintao et al., "Towards Real-World Blind Face Restoration with Generative Facial Prior", CVPR, 2021. (11 pages total).

* cited by examiner

IMAGE PROCESSING APPARATUS AND OPERATION METHOD THEREOF

CROSS-REFERENCE TO RELATED APPLICATION(S)

This application is a bypass continuation of PCT International Application No. PCT/KR2023/004673, which was filed on Apr. 6, 2023, and claims priority to Korean Patent Application No. 10-2022-0056890, filed on May 9, 2022, and Korean Patent Application No. 10-2022-0127170, filed on Oct. 5, 2022, in the Korean Intellectual Property Office, the disclosures of which are incorporated herein by reference in their entireties.

BACKGROUND

1. Field

The disclosure relates to an image processing apparatus for processing an image by using a neural network, and a method for operating the image processing apparatus.

2. Description of Related Art

As data traffic (e.g., image data) increases exponentially with the development of computer technology, the ability of human intelligence to process the data (e.g., manually or through a rules based approach) is insufficient. Artificial intelligence has become an important trend that will drive future innovations. Because artificial intelligence imitates human thinking, it is infinitely applicable to virtually all industries. Representative technologies of artificial intelligence include pattern recognition, machine learning, expert systems, neural networks, natural language processing, etc.

A neural network, for example, models the characteristics of human biological nerve cells by using mathematical expressions, and uses an algorithm that mimics the human ability to learn. Through this algorithm, a neural network is able to generate mapping between input data and output data, and the ability to generate such mapping may be called the learning capability of the neural network. Furthermore, neural networks have an ability to generate, based on training results, correct output data with respect to input data that has not been used for training.

It may be advantageous to apply artificial intelligence techniques, such as neural networks, for processing image data. Such artificial intelligence techniques may enable the performing of image processing tasks automatically, without a need for a human intervention. The image processing tasks may include removing noise or artifacts from an image, increasing a quality of the image, or increasing a resolution of the image.

SUMMARY

Provided are systems and methods for processing an image by using one or more neural networks. The systems and methods enable, for example, removing noise or artifacts from the image, increasing a quality of the image, or increasing a resolution of the image.

According to an aspect of the disclosure, an image processing apparatus may include a memory storing one or more instructions and at least one processor configured to execute the one or more instructions stored in the memory.

The at least one processor may be further configured to execute the one or more instructions stored in the memory to obtain classification information and first feature information of a first image.

The at least one processor may be further configured to execute the one or more instructions stored in the memory to generate a first feature image for the first image by performing first image processing on the classification information and the first feature information.

The at least one processor may be further configured to execute the one or more instructions stored in the memory to obtain second feature information by performing second image processing on the classification information and the first feature information.

The at least one processor may be further configured to execute the one or more instructions stored in the memory to obtain fourth feature information by performing third image processing on third feature information extracted during the first image processing.

The at least one processor may be further configured to execute the one or more instructions stored in the memory to generate a second feature image for the first image, based on the second feature information and the fourth feature information.

The at least one processor may be further configured to execute the one or more instructions stored in the memory to generate a second image based on the first feature image and the second feature image.

The first feature image may include features of non-high frequency components included in the first image, and the second feature image may include features of high frequency components included in the first image.

The second image may have a higher quality than the first image.

The at least one processor may be further configured to execute the one or more instructions stored in the memory to obtain the classification information and the first feature information of the first image by using one or more convolutional neural networks.

The first image processing may include upsampling the first feature information, and the first image, the first feature image, and the second feature image all have a same size.

The second image processing may be performed by a multi-layer perceptron (MLP) module including one or more fully connected layers, and the at least one processor may be further configured to execute the one or more instructions stored in the memory to: perform a multiplication operation between an input data fed to a fully connected layer and a weight matrix included in the fully connected layer and an addition operation with biases included in the fully connected layer.

The at least one processor may be further configured to execute the one or more instructions stored in the memory to: obtain a sub-feature information by performing downscaling and upscaling on the third feature information; obtain a difference information between the sub-feature information and the third feature information; and generate the fourth feature information by performing a convolution operation between the difference information and a pre-trained weight.

The at least one processor may be further configured to execute the one or more instructions stored in the memory to: obtain fifth feature information by performing a first operation on the second feature information; and generate the second feature image by performing a second operation on the fifth feature information and the fourth feature information.

The first operation may include an adaptive instance normalization (AdaIn) operation, and the second operation may include a spatial feature transform (SFT) operation.

According to an aspect of the disclosure, a method of operating an image processing apparatus for processing an image by using at least one neural network may include obtaining classification information and first feature information of a first image.

The operating method of the image processing apparatus for processing an image by using at least one neural network, may include generating a first feature image for the first image by performing first image processing on the classification information and the first feature information.

The operating method of the image processing apparatus for processing an image by using at least one neural network, may include obtaining second feature information by performing second image processing on the classification information and the first feature information.

The operating method of the image processing apparatus for processing an image by using at least one neural network, may include obtaining fourth feature information by performing third image processing on third feature information extracted during the first image processing.

The operating method of the image processing apparatus for processing an image by using at least one neural network, may include generating a second feature image for the first image, based on the second feature information and the fourth feature information.

The operating method of the image processing apparatus for processing an image by using at least one neural network, may include generating a second image based on the first feature image and the second feature image.

The first feature image may include features of non-high frequency components included in the first image, and the second feature image may include features of high frequency components included in the first image.

The second image may have a higher quality than the first image.

The obtaining of the classification information and the first feature information of the first image may include: obtaining the classification information and the first feature information of the first image by using one or more convolutional neural networks.

The first image processing may include upsampling of the first feature information, and the first image, the first feature image, and the second feature image all have the same size.

The second image processing may be performed by a multi-layer perceptron (MLP) module including one or more fully connected layers, and the obtaining of the second feature information by performing the second image processing on the classification information and the first feature information may include: performing a multiplication operation between input data fed to a fully connected layer and a weight matrix included in the fully connected layer and an addition operation with biases included in the fully connected layer.

The obtaining of the fourth feature information by performing the third image processing on the third feature information extracted during the first image processing may include: obtaining sub-feature information by performing downscaling and upscaling on the third feature information; obtaining difference information between the third feature information and the sub-feature information; and generating the fourth feature information by performing a convolution operation between the difference information and a pre-trained weight.

The generating of the second feature image for the first image based on the second feature information and the fourth feature information may include:
obtaining fifth feature information by performing a first operation on the second feature information; and generating the second feature image by performing a second operation on the fifth feature information and the fourth feature information.

The first operation may include an adaptive instance normalization (AdaIn) operation, and the second operation may include a spatial feature transform (SFT) operation.

The third feature information may include a plurality of pieces of intermediate data that may be output by a process of generating the first feature image.

According to an aspect of the disclosure, a non-transitory computer-readable recording medium stores a computer readable program code or instructions which are executable by a processor to perform a method of image processing. The method includes: obtaining classification information and first feature information of a first image; generating a first feature image for the first image by performing first image processing on the classification information and the first feature information; obtaining second feature information by performing second image processing on the classification information and the first feature information; obtaining fourth feature information by performing third image processing on third feature information extracted during the first image processing; generating a second feature image for the first image, based on the second feature information and the fourth feature information; and generating a second image based on the first feature image and the second feature image.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
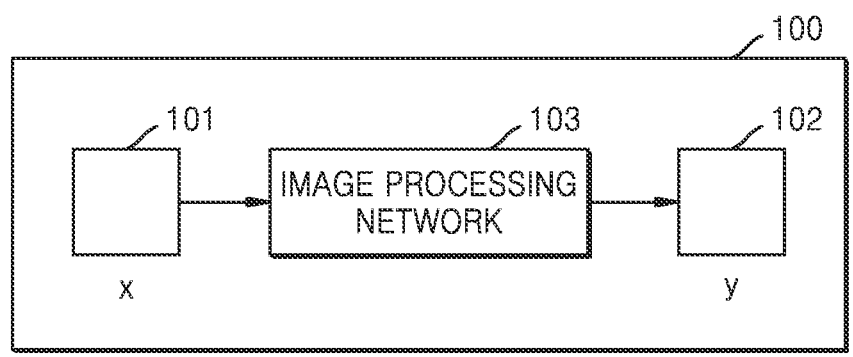
FIG. 1 is a diagram illustrating an operation of an image processing apparatus processing an image by using an image processing network, according to an embodiment of the disclosure.

Throughout the disclosure, the expression "at least one of a, b or c" indicates only a, only b, only c, both a and b, both a and c, both b and c, all of a, b, and c, or variations thereof.

Terms used in the present specification will now be briefly described and then the disclosure will be described in detail.

As the terms used herein, general terms that are currently widely used are selected by taking functions according to the disclosure into account, but the terms may have different meanings according to the intention of one of ordinary skill in the art, precedent cases, or advent of new technologies. Furthermore, specific terms may be arbitrarily selected by the applicant, and in this case, the meaning of the selected terms will be described in detail in the detailed description of the disclosure. Thus, the terms used herein should be defined not by simple appellations thereof but based on the meaning of the terms together with the overall description of the disclosure.

Throughout the specification, when a part "includes" or "comprises" an element, unless there is a particular description contrary thereto, it is understood that the part may further include other elements, not excluding the other elements. In addition, terms such as "portion", "module", etc., described in the specification refer to a unit for processing at least one function or operation and may be implemented as hardware or software, or a combination of hardware and software.

Embodiments of the disclosure will be described more fully hereinafter with reference to the accompanying drawings so that they may be easily implemented by one of ordinary skill in the art. However, embodiments of the disclosure may have different forms and should not be construed as being limited to the embodiments thereof set forth herein. In addition, parts not related to descriptions of the disclosure are omitted to clearly explain embodiments of the disclosure in the drawings, and like reference numerals denote like elements throughout.

FIG. 1 is a diagram illustrating an operation of an image processing apparatus processing an image by using an image processing network, according to an embodiment of the disclosure.

Referring to FIG. 1, an image processing network 103 may receive a first image 101 and process the first image 101 to generate a second image 102. In this case, the first image 101 may be an image including noise or artifacts, and may be a low-resolution image or a low-quality image. An image processing apparatus 100 according to an embodiment of the disclosure may use the image processing network 103 to generate the second image 102 by performing denoising for removing noise while maintaining fine edges and textures of the first image 101. The second image 102 may have a higher quality than the first image 101. The second image 102 may have a higher resolution than the first image 101. However, embodiments of the disclosure are not limited thereto.

According to an embodiment of the disclosure, the image processing network 103 may include one or more neural networks, and for example, include first, second, and third modules and an image synthesizer. However, embodiments of the disclosure are not limited thereto.

Hereinafter, the image processing network 103 according to an embodiment of the disclosure will be described in detail with reference to FIGS. 2 to 8.

Figure 2:
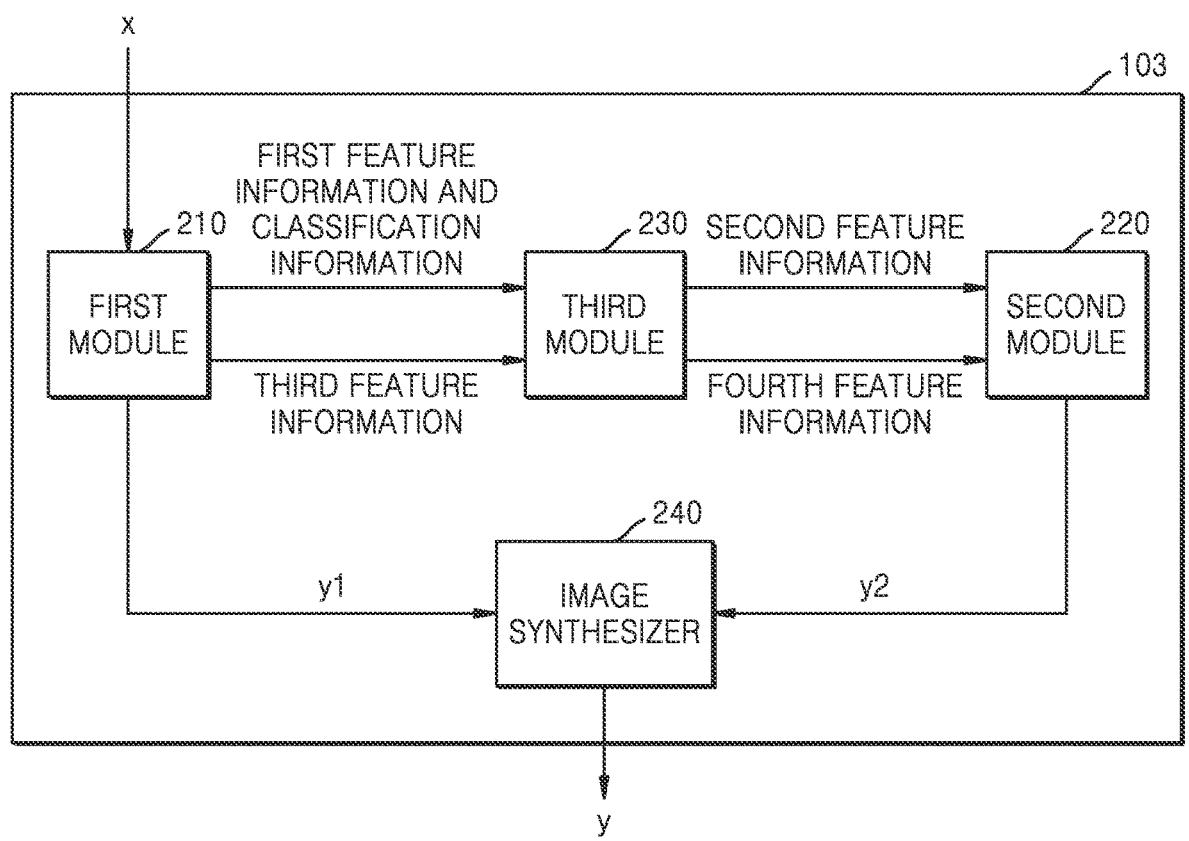
FIG. 2 is a diagram illustrating an image processing network according to an embodiment of the disclosure.

FIG. 2 is a diagram illustrating an image processing network according to an embodiment of the disclosure.

Referring to FIG. 2, the image processing network 103 may include a first module 210, a second module 220, a third module 230, and an image synthesizer 240.

A first image x may be input to the first module 210 according to an embodiment of the disclosure. The first module 210 may obtain first feature information and classification information of the first image x.

The first feature information and the classification information of the first image x obtained by the first module 210 may be input to the third module 230.

Also, the first module 210 may generate a first feature image y1 for the first image x, based on the first feature information and the classification information of the first image x. For example, the first module 210 may generate the first feature image y1 for the first image x by performing first image processing on the first feature information and the classification information of the first image x. The first feature image y1 may be an image including features of non-high frequency components (e.g., low-frequency components and mid-frequency components) included in the first image x. However, embodiments of the disclosure are not limited thereto.

Also, the first module 210 may obtain third feature information extracted during the first image processing, and the third feature information may be input to the third module 230.

The third module 230 may obtain second feature information, based on the first feature information and the classification information of the first image x. The third module 230 may generate the second feature information by performing second image processing on the first feature information and the classification information of the first image x. The second feature information may be input to the second module 220.

The third module 230 may obtain fourth feature information based on the third feature information. The third module 230 may generate the fourth feature information by performing third image processing on the third feature information.

The second feature information and the fourth feature information may be input to the second module 220.

The second module 220 may generate a second feature image y2 for the first image x, based on the second feature information and the fourth feature information. The second feature image y2 may be an image including features of high frequency components included in the first image x. However, embodiments of the disclosure are not limited thereto.

The image synthesizer 240 may generate a second image y by synthesizing the first feature image y1 and the second feature image y2.

Hereinafter, a detailed configuration of each of the first, second, and third modules 210, 220, and 230 will be described in detail with reference to the drawings.

Figure 3:
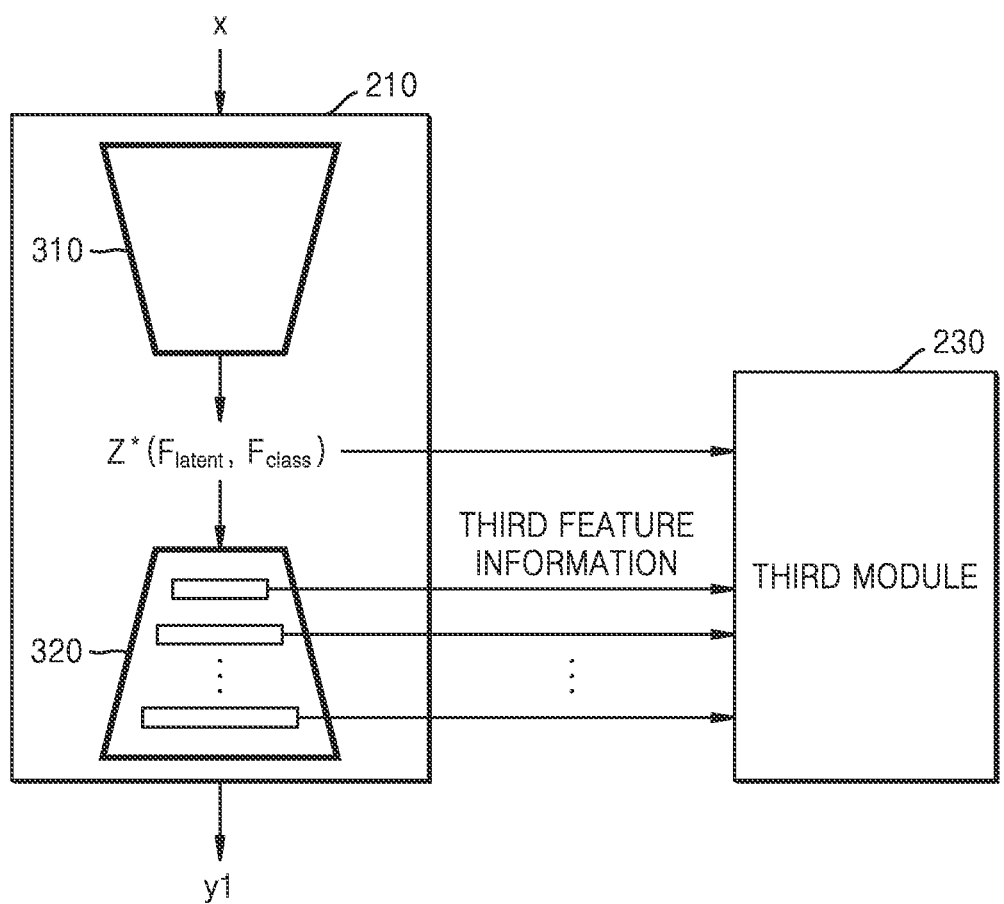
FIG. 3 is a diagram illustrating a first module according to an embodiment of the disclosure.

FIG. 3 is a diagram illustrating a first module according to an embodiment of the disclosure.

Referring to FIG. 3, the first module 210 may include a first feature extractor 310 and a first feature image generator 320.

According to an embodiment of the disclosure, the first feature extractor 310 may include a feature extraction network, and the feature extraction network may include one or more convolution layers. A first image x may be input to the first feature extractor 310, and the first feature extractor 310 may obtain classification information $F_{class}$ and first feature information $F_{latent}$ of the first image x by using the feature extraction network.

A detailed configuration of the first feature extractor 310 will be described with reference to FIG. 4.

Figure 4:
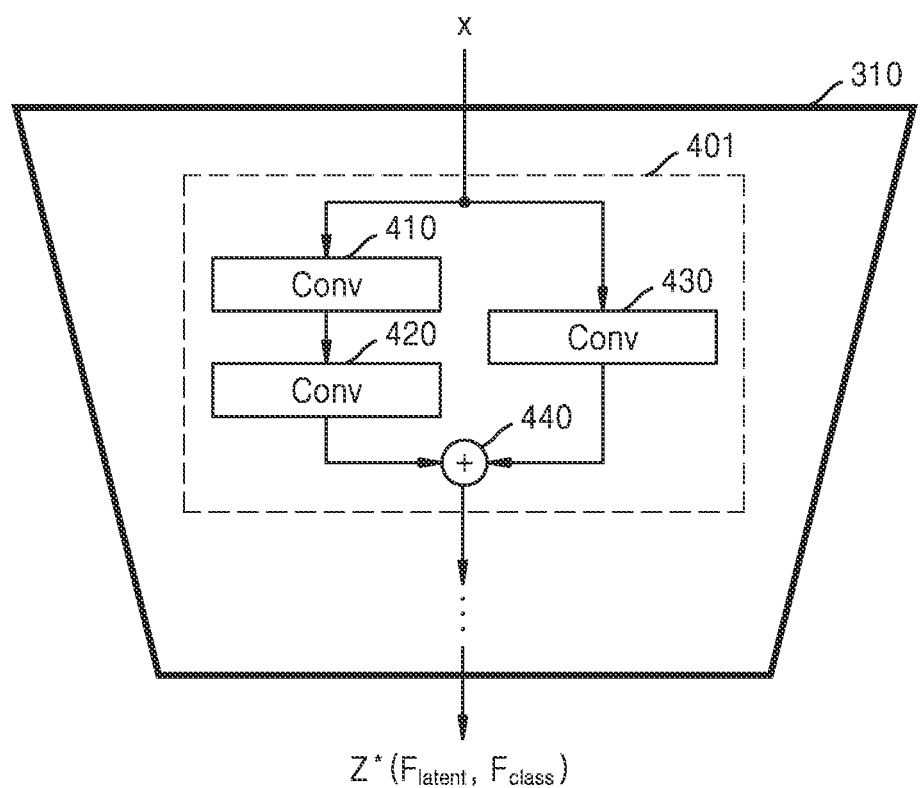
FIG. 4 is a diagram illustrating a first feature extractor according to an embodiment of the disclosure.

FIG. 4 is a diagram illustrating a first feature extractor according to an embodiment of the disclosure.

Referring to FIG. 4, the first feature extractor 310 may obtain first feature data by performing a convolution operation between a first image x and a first weight included in a first convolution layer 410. The first feature extractor 310 may obtain second feature data by performing a convolution operation between the first feature data and a second weight included in a second convolution layer 420.

Furthermore, the first feature extractor 310 may obtain third feature data by performing a convolution operation between the first image x and a third weight included in a third convolution layer 430.

Also, the first feature extractor 310 may perform, in an addition layer 440, an element-wise addition operation between the second feature data and the third feature data.

According to an embodiment of the disclosure, the first feature extractor 310 may include a structure in which a module 401 including the first, second, and third convolution layers 410, 420, and 430, and the addition layer 440 is repeatedly arranged in series. However, embodiments of the disclosure are not limited thereto.

Accordingly, the first feature extractor 310 may obtain classification information $F_{class}$ and first feature information $F_{latent}$ of the first image x. In this case, the classification information $F_{class}$ of the first image x may include data indicating a probability that the first image x is included in each of a plurality of preset categories. Also, the classification information $F_{class}$ and the first feature information $F_{latent}$ of the first image x may each be data in a vector form. However, embodiments of the disclosure are not limited thereto.

Referring back to FIG. 3, the classification information $F_{class}$ and the first feature information $F_{latent}$ of the first image x may be input to the third module 230.

Moreover, the first feature image generator 320 may generate the first feature image y1, based on the classification information $F_{class}$ and the first feature information $F_{latent}$ of the first image x obtained by the first feature extractor 310. The first feature image generator 320 may generate the first feature image y1 by using a feature image generation network. The feature image generation network may include one or more convolution layers.

A detailed configuration of the first feature image generator 320 will be described in detail with reference to FIG. 5.

Figure 5:
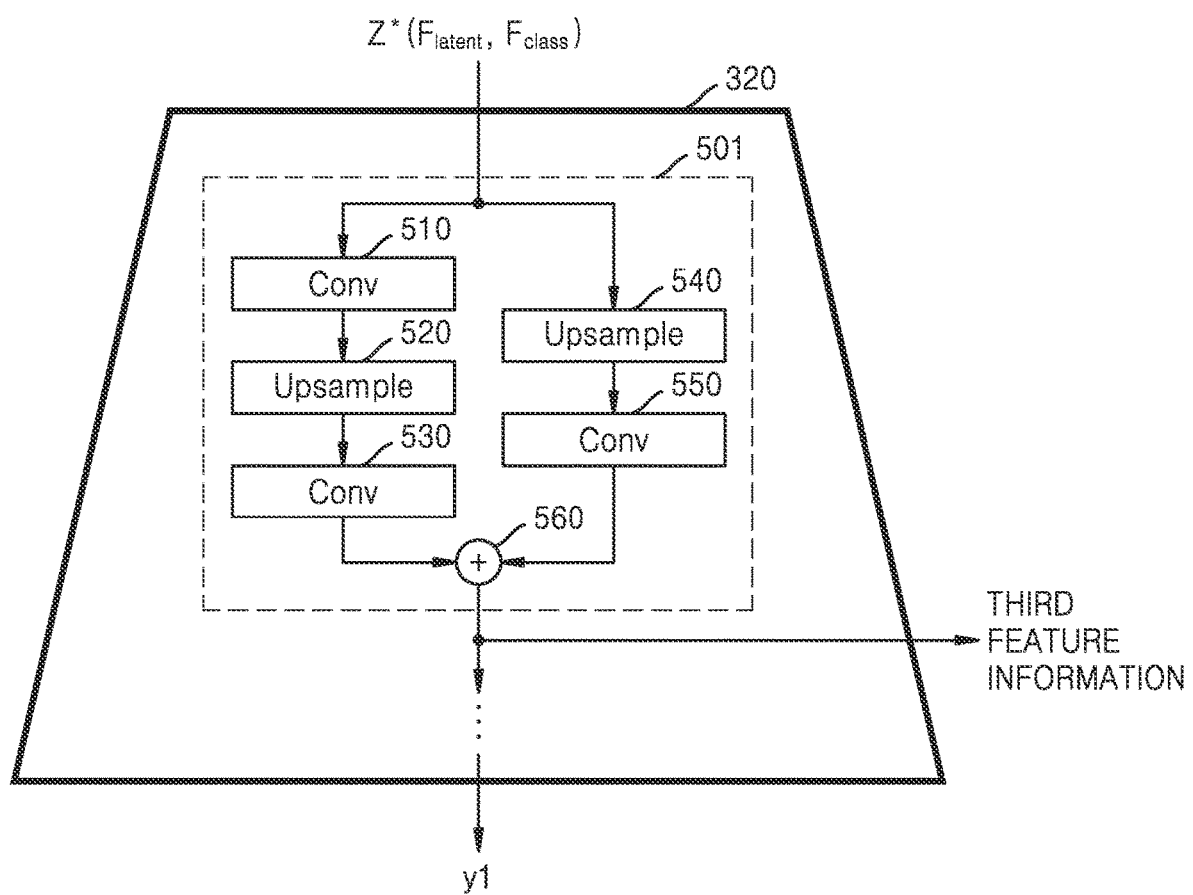
FIG. 5 is a diagram illustrating a first feature image generator according to an embodiment of the disclosure.

FIG. 5 is a diagram illustrating a first feature image generator according to an embodiment of the disclosure.

Referring to FIG. 5, the first feature image generator 320 may obtain fourth feature data by performing a convolution operation between input data including classification information $F_{class}$ and the first feature information $F_{latent}$ of a first image and a fourth weight included in a fourth convolution layer 510.

The first feature image generator 320 may perform upsampling on the fourth feature data in a first upsampling layer 520. For example, the first feature image generator 320 may perform upsampling by using an interpolation method such as bicubic interpolation or bilinear interpolation. Alternatively, the first feature image generator 320 may perform upsampling using a convolution operation. However, embodiments of the disclosure are not limited thereto.

The first feature image generator 320 may obtain fifth feature data by performing a convolution operation between upsampled data and a fifth weight included in a fifth convolution layer 530.

The first feature image generator 320 may perform, in a second upsampling layer 540, upsampling on the input data including the classification information $F_{class}$ and the first feature information $F_{latent}$.

For example, the first feature image generator 320 may perform upsampling by using an interpolation method such as bicubic interpolation or bilinear interpolation. Alternatively, the first feature image generator 320 may perform upsampling using a convolution operation. However, embodiments of the disclosure are not limited thereto.

The first feature image generator 320 may obtain sixth feature data by performing a convolution operation between upsampled data and a sixth weight included in a sixth convolution layer 550.

The first feature image generator 320 may perform, in an addition layer 560, an element-wise addition operation between the fifth feature data and the sixth feature data.

According to an embodiment of the disclosure, the first feature image generator 320 may include a structure in which a module 501 including the fourth convolution layer 510, the first upsampling layer 520, the fifth convolution layer 530, the second upsampling layer 540, the sixth convolution layer 550, and the addition layer 560 is repeatedly arranged in series. However, embodiments of the disclosure are not limited thereto.

The first feature image generator 320 may input, to the third module 230, third feature information output from each module 501 in the structure in which the module 501 is repeatedly arranged in series.

Figure 6:
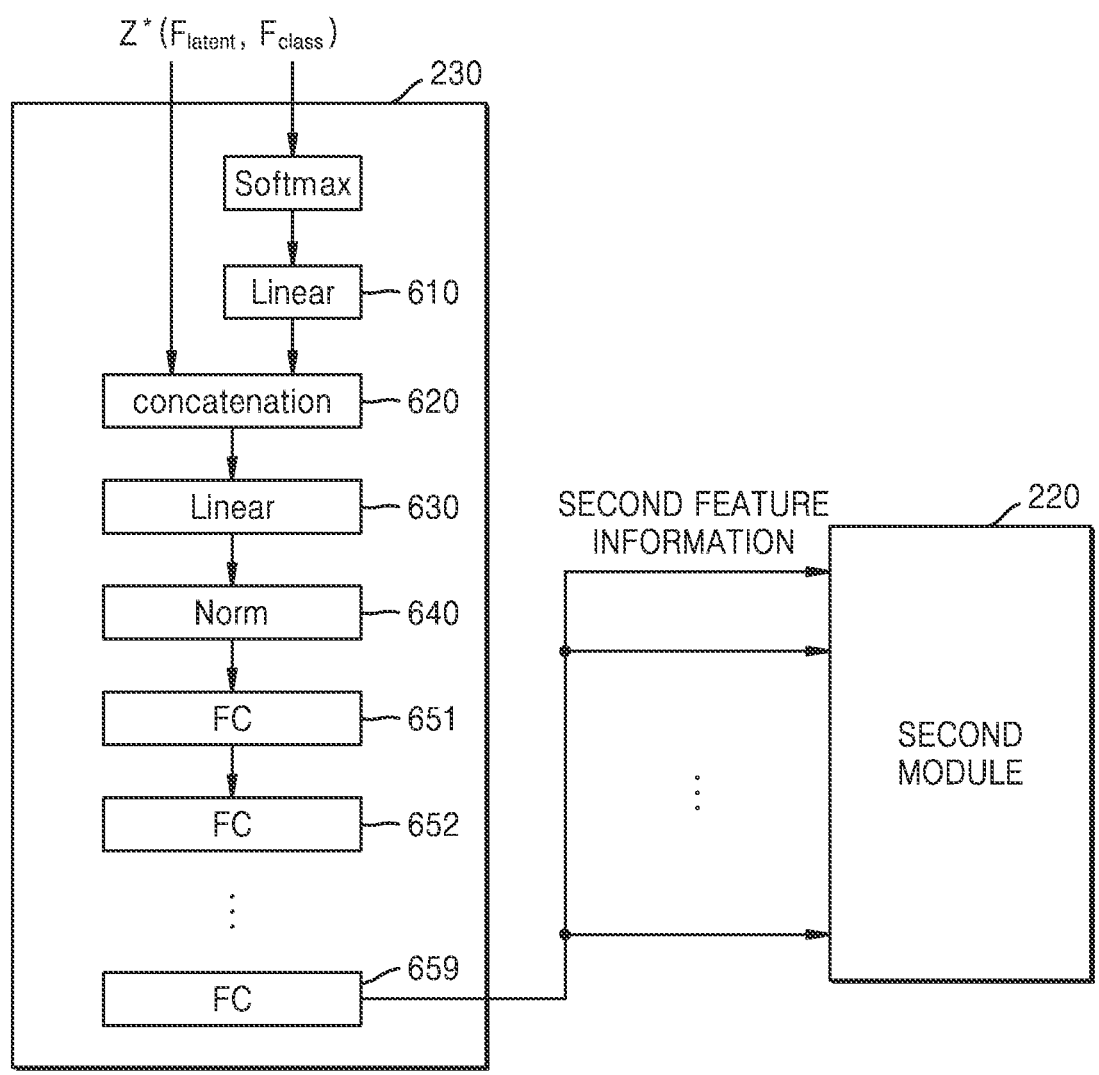
FIG. 6 is a diagram illustrating a method, performed by a third module, of processing classification information and first feature information of a first image, according to an embodiment of the disclosure.
Figure 7:
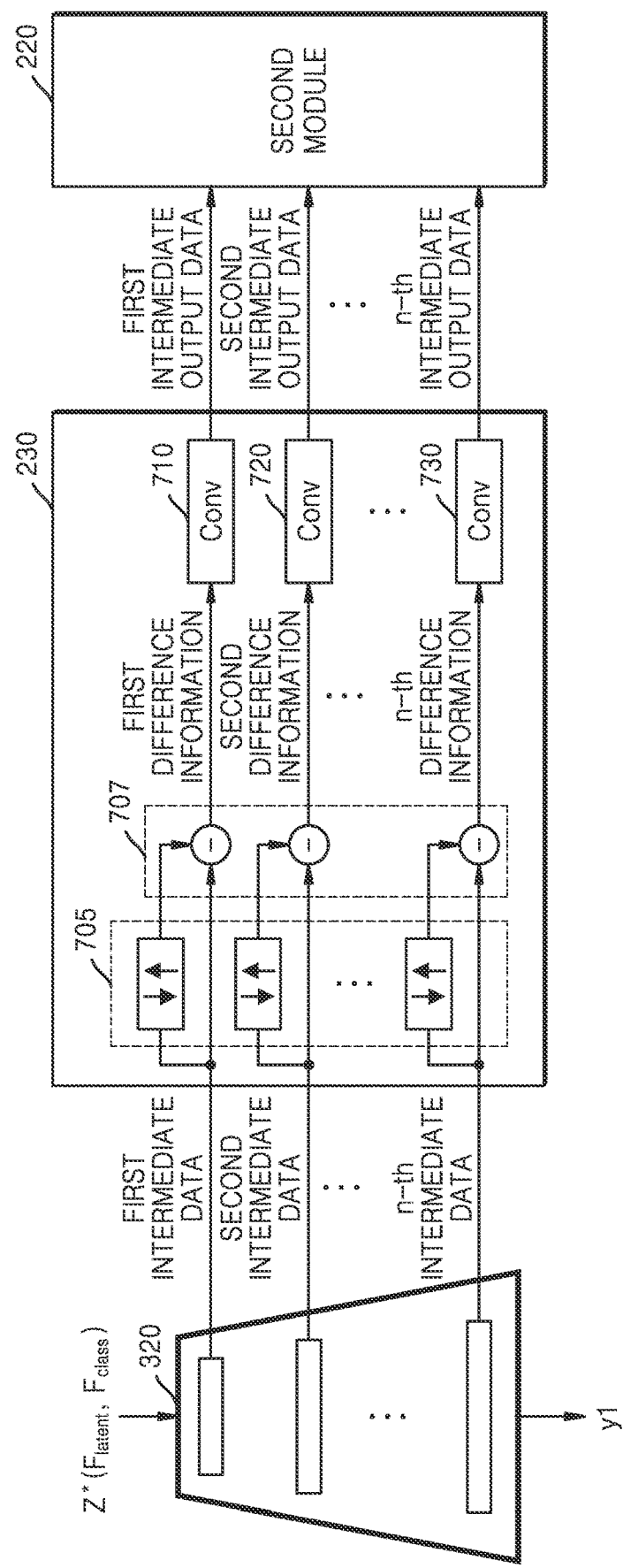
FIG. 7 is a diagram illustrating a method, performed by a third module, of processing third feature information, according to an embodiment of the disclosure.

FIGS. 6 and 7 are diagrams illustrating a third module according to an embodiment of the disclosure.

FIG. 6 is a diagram illustrating a method, performed by a third module, of processing classification information $F_{class}$ and first feature information $F_{latent}$ of a first image, according to an embodiment of the disclosure.

Referring to FIG. 6, the third module 230 may obtain first input data by applying a Softmax function to the classification information $F_{class}$ of the first image input from the first module 210. For example, the first input data may be calculated by using Equation 1 below.

$$p_i = \frac{\exp\left(\frac{z_i}{T}\right)}{\sum_{j=1}^{} \exp\left(\frac{z_j}{T}\right)} \quad \text{[Equation 1]}$$

where $p_i$ denotes an element included in the first input data, and $z_i$ denotes an element included in the classification information $F_{class}$ of the first image. Also, T denotes a temperature parameter applied to a softmax operation. As the temperature parameter T is larger, the classification information $F_{class}$ of the first image may be converted from a hard label into a soft label. For example, when the classification information $F_{class}$ of the first image is converted into a hard label, one of the elements included in the first input data may be represented as 1 while all the other elements may be represented as 0. In this case, because the element having a value of 1 indicates that a probability that the first image is included in a category corresponding to the element is 1, the hard label may mean that the first image is classified as one of a plurality of preset categories.

On the other hand, when the classification information $F_{class}$ is converted into a soft label, a plurality of elements have values other than 0, and each of the elements represents a probability of the first image being included in a category corresponding to the element. Thus, the soft label may represent a probability of the first image being included in each of a plurality of categories, and when a plurality of objects are included in the first image, converting the classification information $F_{class}$ of the first image into a soft label may further increase the accuracy of image processing. However, embodiments of the disclosure are not limited thereto.

The third module 230 may obtain first data by performing a multiplication operation between the first input data obtained from conversion via the softmax operation and a first weight matrix included in a first linear layer 610.

The third module 230 may concatenate, in a concatenation layer 620, first feature information $F_{latent}$ of the first image input from the first module 210 and the first data output from the first linear layer 610. For example, when the first feature information $F_{latent}$ is a 512×1 vector and the first data is a 512×1 vector, the third module 230 may obtain second data in the form of a 1024×1 vector by concatenating the first feature information $F_{latent}$ and the first data.

The third module 230 may obtain third data by performing a multiplication operation between the second data and a second weight matrix included in a second linear layer 630.

The third module 230 may normalize the third data output from the second linear layer 630, and for example, the third module 230 may normalize the third data so that the sum of the third data equals 1. However, embodiments of the disclosure are not limited thereto, and the third data may be normalized using various normalization techniques. Fourth data obtained by normalizing the third data may be input to a multi-layer perceptron (MLP) module.

According to an embodiment of the disclosure, the third module 230 may include the MLP module, and the MLP module may include n fully connected layers. The fourth data may be input to a first fully connected layer 651.

The third module 230 may perform a multiplication operation between the fourth data and a third weight matrix included in the first fully connected layer 651 and an addition operation with biases included in the first fully connected layer 651.

The third module 230 may perform a multiplication operation between fifth data output from the first fully connected layer 651 and a fourth weight matrix included in a second fully connected layer 652 and an addition operation with biases included in the second fully connected layer 652.

Furthermore, the third module 230 may obtain second feature information by performing a multiplication operation between sixth data output from an n−1-th fully connected layer and a fifth weight matrix included in an n-th fully connected layer 659 and an addition operation with biases included in the n-th fully connected layer 659.

The second feature information output from the n-th fully connected layer 659 may be input to the second module 220.

FIG. 7 is a diagram illustrating a method, performed by a third module, of processing third feature information, according to an embodiment of the disclosure.

Referring to FIG. 7, third feature information output from the first feature image generator 320 of the first module 210 may be input to the third module 230.

According to an embodiment of the disclosure, the third feature information may include a plurality of pieces of intermediate data (pieces of first to n-th intermediate data) output during a process of generating a first feature image y1 based on input data including classification information $F_{class}$ and first feature information $F_{latent}$ of a first image.

For example, as described with reference to FIG. 5, the pieces of first to n-th intermediate data may be respectively output from the plurality of modules 501 included in the first feature image generator 320.

According to an embodiment of the disclosure, the third module 230 may perform downsampling and upsampling 705 on the third feature information. The third module 230 may obtain difference information by performing an element-wise subtraction operation 707 between the third feature information and data obtained by performing the downsampling and upsampling 705 on the third feature information.

For example, the third module 230 may obtain first subdata by performing the downsampling and upsampling 705 on the first intermediate data, and obtain a difference between the first intermediate data and the first sub-data as first difference information.

Also, the third module 230 may obtain second sub-data by performing the downsampling and upsampling 705 on the second intermediate data, and obtain second difference information by performing the element-wise subtraction operation 707 between the second intermediate data and the second sub-data.

In addition, the third module 230 may obtain n-th sub-data by performing the downsampling and upsampling 705 on the n-th intermediate data, and obtain n-th difference information by performing the element-wise subtraction operation 707 between the n-th intermediate data and the n-th sub-data.

The third module 230 may obtain fourth feature information by respectively performing convolution operations between the pieces of first to n-th difference information and weights respectively included in first to n-th convolution layers (e.g., convolution layers 710, 720, 730).

For example, the third module 230 may obtain first intermediate output data by performing a convolution operation between the first difference information and a first weight included in the first convolution layer 710.

The third module 230 may obtain second intermediate output data by performing a convolution operation between the second difference information and a second weight included in the second convolution layer 720.

In addition, the third module 230 may obtain n-th intermediate output data by performing a convolution operation between the n-th difference information and an n-th weight included in the n-th convolution layer 730. According to an embodiment of the disclosure, the fourth feature information may include pieces of first to n-th intermediate output data.

The pieces of first to n-th intermediate output data (the fourth feature information) output from the third module 230 may be input to the second module 220.

A detailed configuration of the second module 220 will be described in detail with reference to FIG. 8.

Figure 8:
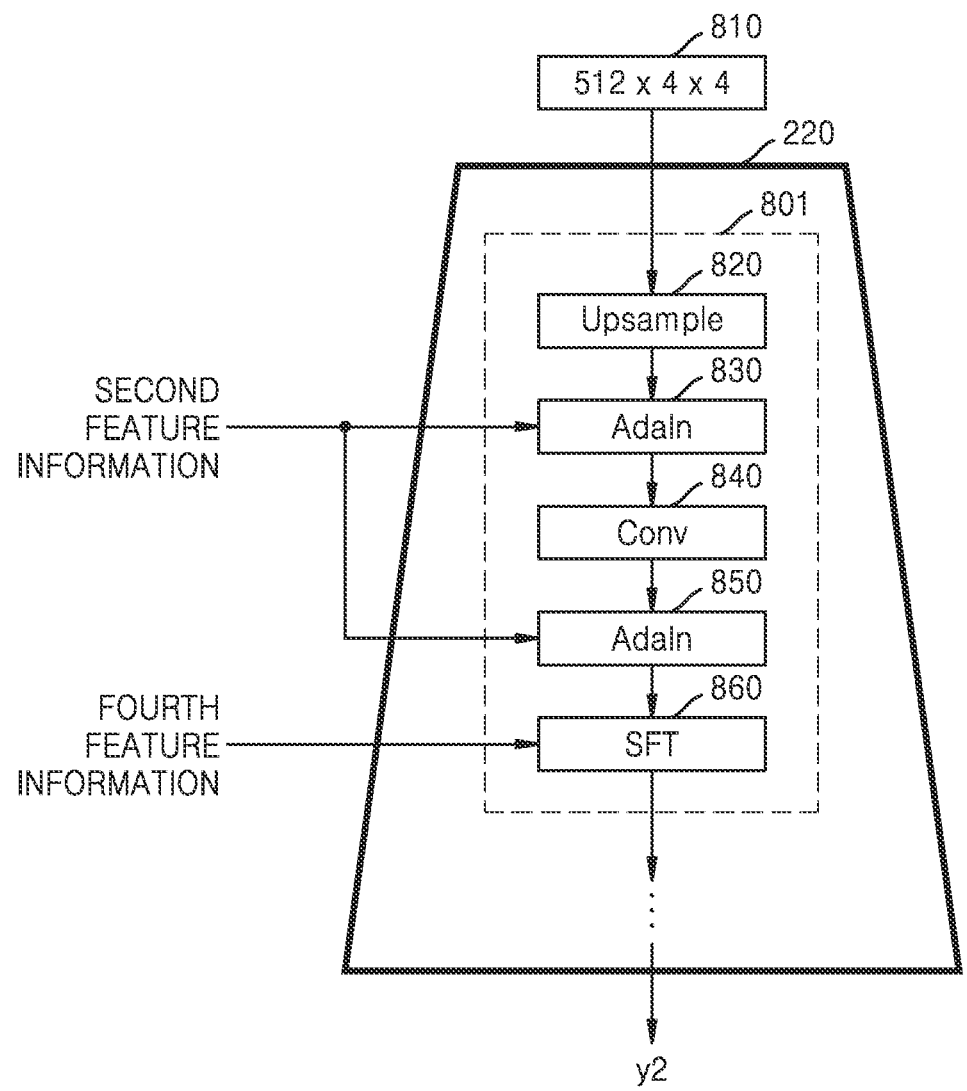
FIG. 8 is a diagram illustrating a second module according to an embodiment of the disclosure.

FIG. 8 is a diagram illustrating a second module according to an embodiment of the disclosure.

Referring to FIG. 8, a pre-trained parameter 810 may be input to the second module 220. For example, a size of the pre-trained parameter 810 may be 512×4×4. According to an embodiment of the disclosure, the pre-trained parameter 810 may be a parameter trained together when the image processing network 103 is trained. However, embodiments of the disclosure are not limited thereto.

According to an embodiment of the disclosure, the second module 220 may obtain first data by upsampling the input parameter 810 in an upsampling layer 820.

The second module 220 may perform an adaptive instance normalization (AdaIn) operation via an AdaIn operator 830, based on the first data and second feature information input from the third module 230. The AdaIn operation may be defined as shown in Equation 2 below.

$$AdaIn(x, y) = \sigma(y)\left(\frac{x - \mu(x)}{\sigma(x)}\right) + \mu(y) \quad \text{[Equation 2]}$$

where $\mu(.)$ denotes a mean and $\sigma(.)$ denotes a standard deviation. AdaIn(x, y) may mean an operation of changing, after normalizing an x value by using a mean and a standard deviation of x, the normalized x value to match a distribution of y by using a mean and a standard deviation of y. In other words, this may mean modulating feature x to match properties of feature y.

Thus, the second module 220 may obtain second data by modulating the first data to match properties of the second feature information via the AdaIn operation in the first AdaIn operator 830.

The second module 220 may obtain third data by performing a convolution operation between the second data and a weight included in a convolution layer 840.

The second module 220 may perform an AdaIn operation via an AdaIn operator 850, based on the third data and the second feature information input from the third module 230. Accordingly, the second module 220 may obtain fourth data by modulating the third data to match properties of the second feature information via the AdaIn operation.

The second module 220 may perform a spatial feature transform (SFT) operation via an SFT operator 860, based on the fourth data and fourth feature information input from the third module 230.

The SFT operation may be defined as shown in Equation 3 below.

$$SFT(F|\gamma, \beta) = \gamma \odot F + \beta \quad \text{[Equation 3]}$$

where $\odot$ denotes an element-wise multiplication operation, F denotes fourth data, and $\gamma$ and $\beta$ are data based on fourth feature information. For example, the fourth feature information may be adjusted to double a dimension of the fourth data F, divided by 2, and allocated to $\gamma$ and $\beta$, respectively. Therefore, F, $\gamma$, and $\beta$ may all have the same dimension.

SFT (F|$\gamma$, $\beta$) means modulating properties of the fourth data F by performing affine transform on the fourth data F using data $\gamma$ and $\beta$. Affine transform is a spatial linear mapping method that may preserve points, straight lines, and planes.

The second module 220 may obtain fifth data by modulating properties of the fourth data using the fourth feature information.

The second module 220 may include a structure in which a module 801 including the upsampling layer 820, the first AdaIn operator 830, the convolution layer 840, the second AdaIn operator 850, and the SFT operator 860 is repeatedly arranged in series. However, embodiments of the disclosure are not limited thereto.

Moreover, the pieces of first to n-th intermediate output data included in the fourth feature information output from the third module 230 may be each input to the SFT operator 860 included in each module 801. For example, the third module 230 may include a structure in which n modules 801 are arranged in series, and the pieces of first to n-th intermediate output data may be respectively input to SFT operators 860 respectively included in the n modules 801.

The second module 220 may generate a second feature image y2 via the n modules 801.

Figure 9:
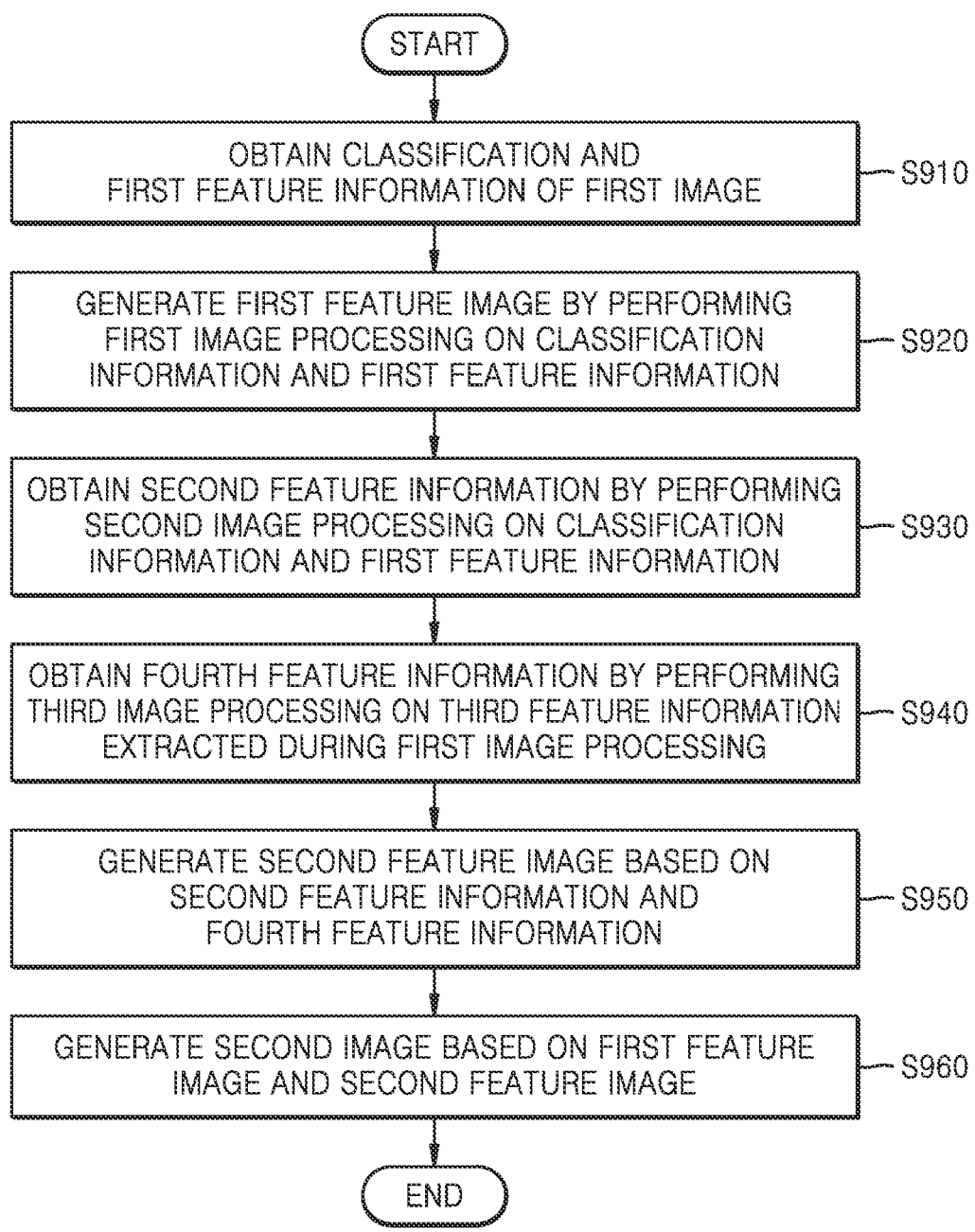
FIG. 9 is a flowchart of an operation method of an image processing apparatus, according to an embodiment of the disclosure.

FIG. 9 is a flowchart of an operation method of an image processing apparatus, according to an embodiment of the disclosure.

Referring to FIG. 9, at S910, the method includes the image processing apparatus 100 obtaining classification information and first feature information of a first image by using one or more neural networks.

The image processing apparatus 100 may obtain the classification information and the first feature information of the first image by using a feature extraction network including one or more convolution layers.

For example, the image processing apparatus 100 may obtain the classification information and the first feature information of the first image by using a first convolution layer, a second convolution layer, a third convolution layer, and an addition layer. Because this has been described in detail with reference to FIG. 4, descriptions already provided above will be omitted here.

At S920, the method includes the image processing apparatus 100 generating a first feature image by performing first image processing on the classification information and the first feature information of the first image.

The image processing apparatus 100 may generate the first feature image by using a feature image generation network including one or more convolution layers. For example, the image processing apparatus 100 may generate the first feature image by using a fourth convolution layer, a first upsampling layer, a fifth convolution layer, a second upsampling layer, a sixth convolution layer, and an addition layer included in a first feature image generator.

Because this has been described in detail with reference to FIG. 5, descriptions already provided above will be omitted here.

At S930, the method includes the image processing apparatus 100 obtaining second feature information by performing second image processing on the classification information and the first feature information of the first image.

For example, the image processing apparatus 100 may generate the second feature information by using one or more neural networks. The image processing apparatus 100 may generate the second feature information by using a first linear layer, a concatenation layer, a second linear layer, a normalization layer, and first to n-th fully connected layers. Because this has been described in detail with reference to FIG. 6, descriptions already provided above will be omitted here.

At S940, the method includes the image processing apparatus 100 obtaining fourth feature information by performing third image processing on third feature information extracted during the first image processing.

For example, the image processing apparatus 100 may obtain the third feature information during the process of generating the first feature image based on the classification information and the first feature information of the first image. The image processing apparatus 100 may obtain the fourth feature information by performing downsampling, upsampling, an element-wise subtraction, and a convolution operation on the third feature information. Because this has been described in detail with reference to FIG. 7, descriptions already provided above will be omitted here.

At S950, the method includes the image processing apparatus 100 generating a second feature image, based on the second feature information obtained in operation S930 and the fourth feature information obtained in operation S940.

For example, the image processing apparatus 100 may generate the second feature image by performing upsampling, an AdaIn operation, a convolution operation, an SFT operation, etc. using the second feature information and the fourth feature information. Because this has been described in detail with reference to FIG. 8, descriptions already provided above will be omitted here.

At S960, the method includes the image processing apparatus 100 generates a second image based on the first feature image and the second feature image.

For example, the image processing apparatus 100 may generate a second image by synthesizing the first feature image and the second feature image.

According to an embodiment of the disclosure, the second image may have a higher resolution than the first image, and may be an image whose quality is improved compared to the first image by removing artifacts and noise from the first image.

Figure 10:
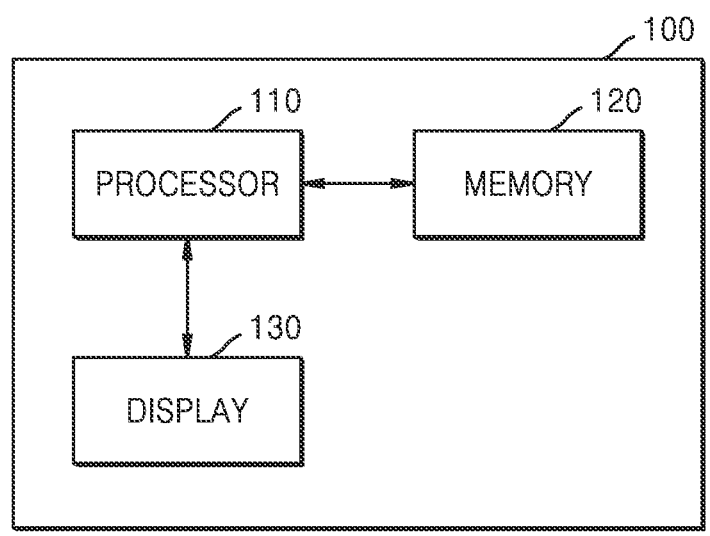
FIG. 10 is a block diagram of a configuration of an image processing apparatus according to an embodiment of the disclosure.

FIG. 10 is a block diagram of a configuration of an image processing apparatus according to an embodiment of the disclosure.

An image processing apparatus 100 of FIG. 10 may be an apparatus that performs image processing by using the image processing network (103 of FIG. 2). According to an embodiment of the disclosure, the image processing network 103 may include one or more neural networks. For example, the image processing network 103 may include the first, second, and third modules 210, 220, and 230, and the image synthesizer 240. However, embodiments of the disclosure are not limited thereto.

Referring to FIG. 10, according to an embodiment of the disclosure, the image processing apparatus 100 may include a processor 110, a memory 120, and a display 130.

According to an embodiment of the disclosure, the processor 110 may control all operations of the image processing apparatus 100. According to an embodiment of the disclosure, the processor 110 may execute one or more programs stored in the memory 120.

According to an embodiment of the disclosure, the memory 120 may store various pieces of data, programs, or applications for driving and controlling the image processing apparatus 100. A program stored in the memory 120 may include one or more instructions. A program (one or more instructions) or an application stored in the memory 120 may be executed by the processor 110.

According to an embodiment of the disclosure, the processor 110 may include at least one of a central processing unit (CPU), a graphics processing unit (GPU), or a video processing unit (VPU). Alternatively, according to an embodiment of the disclosure, the processor 110 may be implemented in the form of a system-on-chip (SoC) that integrates at least one of a CPU, a GPU, or a VPU. Alternatively, the processor 110 may further include a neural processing unit (NPU).

According to an embodiment of the disclosure, the processor 110 may generate a second image by processing a first image using one or more neural networks. For example, the processor 110 may use the image processing network 103 to generate a second image by performing denoising for removing noise from the first image while maintaining fine edges and textures thereof. According to an embodiment of the disclosure, the second image may have a higher quality than the first image. Alternatively, the processor 110 may generate a second image having a higher resolution than the first image by using the image processing network 103.

According to an embodiment of the disclosure, the processor 110 may obtain classification information and first feature information of a first image by using the first module 210. In this case, the classification information of the first image may include data indicating a probability that the first image is included in each of a plurality of preset categories. The first module 210 may include a feature extraction network including one or more convolution layers, and the processor 110 may obtain the classification information and the first feature information of the first image by using the feature extraction network. Because a configuration of the feature extraction network has been described in detail with reference to FIG. 4, a detailed description thereof will be omitted here.

Furthermore, the processor 110 may use the first module 210 to generate a first feature image by performing first image processing on the classification information and the first feature information of the first image. According to an embodiment of the disclosure, the first feature image may be an image including features of non-high frequency components (e.g., low-frequency components and mid-frequency components) included in the first image. However, embodiments of the disclosure are not limited thereto.

The first module 210 may include a feature image generation network including one or more convolution layers, and the processor 110 may generate the first feature image by using the feature image generation network. Because the configuration and operation of the feature image generation network has been described in detail with reference to FIG. 5, a detailed description thereof will be omitted here.

The processor 110 may also extract third feature information during a process of performing the first image processing by using the feature image generation network.

For example, the processor 110 may obtain third feature information including pieces of first to n-th intermediate data during performing the first image processing.

According to an embodiment of the disclosure, the processor 110 may use the third module 230 to obtain second feature information by performing second image processing on the classification information and the first feature information of the first image. Because this has been described in detail with reference to FIG. 6, descriptions already provided above will be omitted here.

According to an embodiment of the disclosure, the processor 110 may use the third module 230 to obtain fourth feature information by performing third image processing on the third feature information including the pieces of first to n-th intermediate data. Because this has been described in detail with reference to FIG. 7, descriptions already provided above will be omitted here.

According to an embodiment of the disclosure, the processor 110 may generate a second feature image, based on the second feature information and the fourth feature information, by using the second module 220.

For example, the processor 110 may generate a second feature image by performing upsampling, an AdaIn operation, a convolution operation, an SFT operation, etc. using the second feature information and the fourth feature information. Because this has been described in detail with reference to FIG. 8, descriptions already provided above will be omitted here.

According to an embodiment of the disclosure, the processor 110 may generate a second image by synthesizing the first feature image and the second feature image.

Moreover, according to an embodiment of the disclosure, the image processing network 103 may be a network trained by a server or an external device. The external device may train the image processing network 103 based on training data. In this case, the training data may include a plurality of data sets including image data containing noise and image data from which noise is removed while edge features or texture features are preserved.

The server or external device may determine parameter values included in kernels respectively used in a plurality of convolution layers in the image processing network 103 and parameter values included in weight matrices respectively used in linear layers or fully connected layers. For example, the server or external device may determine parameter values in a direction to minimize a difference (missing information) between image data generated by the image processing network 103 and image data (training data) from which noise is removed while edge features are preserved.

According to an embodiment of the disclosure, the image processing apparatus 100 may receive the trained image processing network 103 from the server or external device and store the trained image processing network 103 in the memory 120. For example, the memory 120 may store a structure and parameter values of the image processing network 103 according to an embodiment of the disclosure, and the processor 110 may use the parameter values stored in the memory 120 to generate a second image by removing noise from the first image while preserving edge features, according to an embodiment of the disclosure.

According to an embodiment of the disclosure, the display 130 generates a driving signal by converting an image signal, a data signal, an on-screen display (OSD) signal, a control signal, etc. processed by the processor 110. The display 130 may be implemented as a plasma display panel (PDP), a liquid crystal display (LCD), an organic light-emitting diode (OLED) display, a flexible display, or a three-dimensional (3D) display. Furthermore, the display 130 may be formed as a touch screen to serve as an input device as well as an output device.

According to an embodiment of the disclosure, the display 130 may display the second image obtained by performing image processing using the image processing network 103.

The block diagram of the image processing apparatus 100 of FIG. 10 is provided for illustration of an embodiment of the disclosure. Each of the components in the block diagram may be integrated, added, or omitted according to the specification of the image processing apparatus 100 that is actually implemented. In other words, two or more components may be combined into a single component, or a single component may be split into two or more components when necessary. Furthermore, functions performed by each block are intended to describe embodiments of the disclosure, and a specific operation or device related to the functions does not limit the scope of the disclosure.

According to an embodiment of the disclosure, an image processing apparatus may process images by using one or more neural networks.

According to an embodiment of the disclosure, an image processing apparatus may include a memory storing one or more instructions and at least one processor configured to execute the one or more instructions.

According to an embodiment of the disclosure, the at least one processor may obtain classification information and first feature information of a first image by executing the one or more instructions stored in the memory.

According to an embodiment of the disclosure, by executing the one or more instructions stored in the memory, the at least one processor may generate a first feature image for the first image by performing first image processing on the classification information and the first feature information.

According to an embodiment of the disclosure, by executing the one or more instructions stored in the memory, the at least one processor may obtain second feature information by performing second image processing on the classification information and the first feature information.

According to an embodiment of the disclosure, by executing the one or more instructions stored in the memory, the at least one processor may obtain fourth feature information by performing third image processing on third feature information extracted during the first image processing.

According to an embodiment of the disclosure, by executing the one or more instructions stored in the memory, the at least one processor may generate a second feature image for the first image, based on the second feature information and the fourth feature information.

According to an embodiment of the disclosure, by executing the one or more instructions stored in the memory, the at least one processor may generate a second image based on the first feature image and the second feature image.

The first feature image may include features of non-high frequency components included in the first image.

The second feature image may include features of high frequency components included in the first image.

The second image may have a higher quality than the first image.

The one or more neural networks may include one or more convolutional neural networks (CNNs).

According to an embodiment of the disclosure, by executing the one or more instructions stored in the memory, the at least one processor may obtain the classification information and the first feature information of the first image by using the one or more CNNs.

The first image processing may include upsampling of the first feature information.

The first image, the first feature image, and the second feature image may all have the same size.

The second image processing may be performed by a MLP module including one or more fully connected layers.

According to an embodiment of the disclosure, by executing the one or more instructions stored in the memory, the at least one processor may perform a multiplication operation between input data fed to a fully connected layer and a weight matrix included in the fully connected layer and an addition operation with biases included in the fully connected layer.

By executing the one or more instructions stored in the memory, the at least one processor may obtain sub-feature information by performing downscaling and upscaling on the third feature information.

The at least one processor may obtain difference information between the sub-feature information and the third feature information by executing the one or more instructions stored in the memory.

By executing the one or more instructions stored in the memory, the at least one processor may generate the fourth feature information by performing a convolution operation between the difference information and a pre-trained weight.

By executing the one or more instructions stored in the memory, the at least one processor may obtain fifth feature information by performing a first operation on the second feature information.

By executing the one or more instructions stored in the memory, the at least one processor may generate the second feature image by performing a second operation on the fifth feature information and the fourth feature information.

The first operation may include an AdaIn operation.

The second operation may include an SFT operation.

An operation method of an image processing apparatus for processing an image using one or more neural networks, according to an embodiment of the disclosure, may include obtaining classification information and first feature information of a first image.

According to an embodiment of the disclosure, the operation method of the image processing apparatus for processing an image by using the one or more neural networks may include generating a first feature image for the first image by performing first image processing on the classification information and the first feature information.

According to an embodiment of the disclosure, the operation method of the image processing apparatus for processing an image by using the one or more neural networks may include obtaining second feature information by performing second image processing on the classification information and the first feature information.

According to an embodiment of the disclosure, the operation method of the image processing apparatus for processing an image by using the one or more neural networks may include obtaining fourth feature information by performing third image processing on third feature information extracted during the first image processing.

According to an embodiment of the disclosure, the operation method of the image processing apparatus for processing an image by using the one or more neural networks may include generating a second feature image for the first image, based on the second feature information and the fourth feature information.

According to an embodiment of the disclosure, the operation method of the image processing apparatus for processing an image by using the one or more neural networks may include generating a second image based on the first feature image and the second feature image.

The first feature image may include features of non-high frequency components included in the first image.

The second feature image may include features of high frequency components included in the first image.

The second image may have a higher quality than the first image.

The one or more neural networks may include one or more CNNs.

The obtaining of the classification information and the first feature information of the first image may include obtaining the classification information and the first feature information of the first image by using the one or more CNNs.

The first image processing may include upsampling of the first feature information.

The first image, the first feature image, and the second feature image may all have the same size.

The second image processing may be performed by a MLP module including one or more fully connected layers.

The obtaining of the second feature information by performing the second image processing on the classification information and the first feature information may include performing a multiplication operation between input data fed to a fully connected layer and a weight matrix included in the fully connected layer and then an addition operation with biases included in the fully connected layer.

The obtaining of the fourth feature information by performing the third image processing on the third feature information extracted during the first image processing may include obtaining sub-feature information by performing downscaling and upscaling on the third feature information.

The obtaining of the fourth feature information by performing the third image processing on the third feature information extracted during the first image processing may include obtaining difference information between the third feature information and the sub-feature information.

The obtaining of the fourth feature information by performing the third image processing on the third feature information extracted during the first image processing may include generating the fourth feature information by performing a convolution operation between the difference information and a pre-trained weight.

The generating of the second feature image for the first image based on the second feature information and the fourth feature information may include obtaining fifth feature information by performing a first operation on the second feature information.

The generating of the second feature image for the first image based on the second feature information and the fourth feature information may include generating the second feature image by performing a second operation on the fifth feature information and the fourth feature information.

The first operation may include an AdaIn operation.

The second operation may include an SFT operation.

An image processing apparatus according to an embodiment of the disclosure may generate a high-quality second image by adaptively processing a first image included in various categories by using classification information as well as feature information of the first image for image processing.

Accordingly, image processing according to an embodiment of the disclosure may exhibit improved performance compared to existing image processing techniques. For example, the degree of improvement in the quality of the generated second image or the degree of noise removal may be increased compared to in an image processed by the existing image processing techniques.

An operation method of an image processing apparatus according to an embodiment of the disclosure may be implemented in the form of program commands that may be performed by various types of computers, and may be recorded on non-transitory computer-readable recording media. The computer-readable recording media may include program commands, data files, data structures, etc. either alone or in combination. The program commands recorded on the computer-readable recording media may be designed and configured specially for the disclosure or may be known to and be usable by those skilled in the art of computer software. Examples of the non-transitory computer-readable recording media include magnetic media such as hard disks, floppy disks, and magnetic tapes, optical media such as compact disk read-only memory (CD-ROM) and digital versatile disks (DVDs), magneto-optical media such as floptical disks, and hardware devices that are specially configured to store and perform program commands, such as ROM, random access memory (RAM), flash memory, etc. Examples of program commands include not only machine code such as that created by a compiler but also high-level language code that may be executed by a computer using an interpreter or the like.

In addition, an image processing apparatus and an operation method of the image processing apparatus according to embodiments of the disclosure may be included in a computer program product when provided. The computer program product may be traded, as a product, between a seller and a buyer.

The computer program product may include a software program and a computer-readable storage medium having the software program stored therein. For example, the computer program product may include a product (e.g., a downloadable application) in the form of a software program electronically distributed by a manufacturer of an electronic device or through an electronic market (e.g., Google Play Store™ and App Store™). For such electronic distribution, at least a part of the software program may be stored on the storage medium or may be temporarily generated. In this case, the storage medium may be a storage medium of a server of the manufacturer, a server of the electronic market, or a relay server for temporarily storing the software program.

In a system consisting of a server and a client device, the computer program product may include a storage medium of the server or a storage medium of the client device. Alternatively, in a case where there is a third device (e.g., a smartphone) communicatively connected to the server or client device, the computer program product may include a storage medium of the third device. Alternatively, the computer program product may include a software program itself that is transmitted from the server to the client device or the third device or that is transmitted from the third device to the client device.

In this case, one of the server, the client device, and the third device may execute the computer program product to perform methods according to embodiments of the disclosure. Alternatively, at least two of the server, the client device, and the third device may execute the computer program product to perform the methods according to the embodiments of the disclosure in a distributed manner.

For example, the server (e.g., a cloud server, an artificial intelligence server, or the like) may execute the computer program product stored therein to control the client device communicatively connected to the server to perform the methods according to the embodiments of the disclosure.

While embodiments of the disclosure have been particularly described above, the embodiments of the disclosure are not to be construed as limiting the scope of the disclosure, and various modifications and improvements made by those skilled in the art based on a basic concept of the disclosure also fall within the scope of the disclosure as defined by the following claims and their equivalents.

What is claimed is:

1. An image processing apparatus comprising:
    a memory storing at least one instruction; and
    at least one processor configured to execute the at least one instruction to:
        obtain classification information of a first image and first feature information of the first image,
        generate a first feature image for the first image by performing first image processing on the classification information and the first feature information,
        obtain second feature information by performing second image processing on the classification information and the first feature information,
        obtain fourth feature information by performing third image processing on third feature information extracted during the first image processing,
        generate a second feature image for the first image, based on the second feature information and the fourth feature information, and
        generate a second image based on the first feature image and the second feature image.

2. The image processing apparatus of claim 1, wherein the first feature image comprises features of non-high frequency components in the first image, and wherein the second feature image comprises features of high frequency components in the first image.

3. The image processing apparatus of claim 1, wherein a quality of the second image is higher than a quality of the first image.

4. The image processing apparatus of claim 1, wherein the at least one processor is further configured to execute the at least one instruction to obtain the classification information and the first feature information by using at least one convolutional neural network.

5. The image processing apparatus of claim 1, wherein the first image processing comprises upsampling the first feature information, and
    wherein the first image, the first feature image, and the second feature image have a same size.

6. The image processing apparatus of claim 1, wherein the second image processing is performed by a multi-layer perceptron (MLP) module comprising at least one fully connected layer,
    wherein the at least one processor is further configured to execute the at least one instruction to perform a multiplication operation between an input data fed to a fully connected layer and a weight matrix in the fully connected layer and an addition operation with biases in the fully connected layer.

7. The image processing apparatus of claim 1, wherein the at least one processor is further configured to execute the at least one instruction to:
    obtain a sub-feature information by performing downscaling and upscaling on the third feature information;
    obtain a difference information between the sub-feature information and the third feature information; and
    generate the fourth feature information by performing a convolution operation between the difference information and a pre-trained weight.

8. The image processing apparatus of claim 1, wherein the at least one processor is further configured to execute the at least one instruction to:
    obtain fifth feature information by performing a first operation on the second feature information; and
    generate the second feature image by performing a second operation on the fifth feature information and the fourth feature information.

9. The image processing apparatus of claim 8, wherein the first operation comprises an adaptive instance normalization (AdaIn) operation, and
    wherein the second operation comprises a spatial feature transform (SFT) operation.

10. A method of operating an image processing apparatus comprising:
    obtaining classification information of a first image and first feature information of the first image;
    generating a first feature image for the first image by performing first image processing on the classification information and the first feature information;
    obtaining second feature information by performing second image processing on the classification information and the first feature information;
    obtaining fourth feature information by performing third image processing on third feature information extracted during the first image processing;
    generating a second feature image for the first image, based on the second feature information and the fourth feature information; and
    generating a second image based on the first feature image and the second feature image.

11. The method of claim 10, wherein the first feature image comprises features of non-high frequency components in the first image, and
wherein the second feature image comprises features of high frequency components in the first image.

12. The method of claim 10, wherein a quality of the second image is higher than a quality of the first image.

13. The method of claim 10, wherein the obtaining the classification information and the first feature information comprises:
obtaining the classification information and the first feature information of the first image by using at least one convolutional neural network.

14. The method of claim 10, wherein the first image processing comprises upsampling of the first feature information, and
wherein the first image, the first feature image, and the second feature image have a same size.

15. The method of claim 10, wherein the second image processing is performed by a multi-layer perceptron (MLP) module comprising at least one fully connected layer, and
wherein the obtaining the second feature information by performing the second image processing on the classification information and the first feature information comprises:
performing a multiplication operation between input data fed to a fully connected layer and a weight matrix in the fully connected layer and an addition operation with biases in the fully connected layer.

16. The method of claim 10, wherein the obtaining the fourth feature information by performing the third image processing on the third feature information extracted during the first image processing comprises:
obtaining sub-feature information by performing downscaling and upscaling on the third feature information;
obtaining difference information between the third feature information and the sub-feature information; and
generating the fourth feature information by performing a convolution operation between the difference information and a pre-trained weight.

17. The method of claim 10, wherein the generating the second feature image for the first image based on the second feature information and the fourth feature information comprises:
obtaining fifth feature information by performing a first operation on the second feature information; and
generating the second feature image by performing a second operation on the fifth feature information and the fourth feature information.

18. The method of claim 17, wherein the first operation comprises an adaptive instance normalization (AdaIn) operation, and
wherein the second operation comprises a spatial feature transform (SFT) operation.

19. The method of claim 10, wherein the third feature information comprises a plurality of pieces of intermediate data that is output by a process of generating the first feature image.

20. A non-transitory computer-readable recording medium storing computer readable program code or instructions which are executable by a processor to perform a method of image processing, the method comprising:
obtaining classification information of a first image and first feature information of the first image;
generating a first feature image for the first image by performing first image processing on the classification information and the first feature information;
obtaining second feature information by performing second image processing on the classification information and the first feature information;
obtaining fourth feature information by performing third image processing on third feature information extracted during the first image processing;
generating a second feature image for the first image, based on the second feature information and the fourth feature information; and
generating a second image based on the first feature image and the second feature image.

* * * * *